United States Patent Office 2,801,240
Patented July 30, 1957

2,801,240

HYDROLYSIS OF CELLULOSE ISOBUTYRATE

Carl J. Malm and Leo J. Tanghe, Rochester, N. Y., assignors to Eastman Kodak Company, Rochester, N. Y., a corporation of New Jersey No Drawing. Application June 7, 1954,
Serial No. 435,045

5 Claims. (Cl. 260—230)

This invention relates to a method of hydrolyzing cellulose isobutyrate which method allows maximum amounts of water in the hydrolysis bath.

Cellulose isobutyrate has many desirable properties included among which are high resistance to water and excellent stability towards hydrolysis. These properties are useful in the finished product but in those cases where it is desired to change the solubility or modify the properties of the cellulose ester by hydrolysis the water resistance characteristic of cellulose isobutyrate creates difficulties.

In the preparation of cellulose isobutyrate, zinc chloride has been found to be a most suitable catalyst because that salt promotes the esterification of cellulose with isobutyric anhydride without contributing to any substantial breakdown of the cellulose. However, in spent esterification baths in which zinc chloride is present the amount of water which can be tolerated is small and therefore breakdown of the viscosity of the cellulose ester is accelerated during the hydrolysis procedure. Due to the resistance of cellulose isobutyrate to hydrolysis it has usually been necessary in that hydrolysis to use an unusually large proportion of mineral acid, a high temperature or a long hydrolysis time to obtain the desired hydroxyl content. These conditions contribute to the breakdown of cellulose and a cellulose isobutyrate of low viscosity results. If the water concentration in the hydrolysis bath can be increased, for instance to a concentration of 10–20%, protection against breakdown of the cellulose is obtained without slowing down the hydrolysis. However, as the solubility of water in isobutyric acid is limited and the presence of zinc chloride or mineral acid in a hydrolysis mass decreases the tolerance for water, any attempt to hydrolyze cellulose isobutyrate in the esterification bath in which it is prepared creates difficulties.

In the prior art, processes of preparing hydrolyzed cellulose esters have been described in which zinc chloride has been employed as the catalyst in the esterification. In those cases the ester has been separated from the esterification bath, washed and dried and the ester has been redissolved in dilute aqueous fatty acid and hydrolyzed. Such an operation, however, is uneconomical and wasteful of solvent.

One object of our invention is to provide a method for hydrolyzing cellulose isobutyrate in which viscosity breakdown of the cellulose ester is minimized. Another object of our invention is to provide a method for hydrolyzing cellulose isobutyrates in which the miscibility of water with the esterification mass is considerably improved and therefore more water can be employed in the hydrolysis step. A further object of our invention is to provide a procedure for hydrolyzing cellulose isobutyrate in which separation of the cellulose ester from the esterification bath preliminary to its hydrolysis becomes unnecessary. Other objects of our invention will appear herein.

Our invention relates particularly to the preparation of hydrolyzed cellulose isobutyrates which result from the esterification of activated cellulose with isobutyric anhydride and zinc chloride catalyst as described in Malm and Blanchard application Serial No. 435,041 filed of even date. After the completion of the esterification the excess anhydride therein is destroyed by slowly adding aqueous acid to the mass and the cellulose ester is then ready for hydrolysis. We have found that if to the completed esterification mass there is added acetic acid in the proper proportion, the miscibility of water and isobutyric acid is improved and the water concentration may be so adjusted that optimum conditions prevail. This procedure involves mixing with esterification masses acetic acid or a mixture of acetic and isobutyric acids in such proportions that the acetic acid in the complete hydrolysis bath constitutes 40–60% of the mixture of acetic and isobutyric acids in the mass. Such procedure results in a cellulose ester mass which tolerates considerable proportions of water such as amounts within the range of 10–20% of water based on the total liquid of the bath.

The proportion of acetic acid employed should be such that the miscibility of water and isobutyric acid are improved. We have found that the amount of acetic acid which is added preliminary to hydrolysis to give the maximum water tolerance properties is such that the hydrolysis mass contains 40–60% of acetic acid based on total fatty acid. The water is added to the mass, preferably in the form of dilute aqueous acid, to constitute an amount of within the range of 10–20% of the total liquid mass. If the water is added in the form of aqueous acetic acid, this acid is also included in the 40–60% of acetic acid based on the total fatty acid present. The amount of water is desirably the maximum which can be added without causing precipitation of the cellulose ester which value will be within the 10–20% range and usually within the range of 10–15%. In the case of certain conditions such as temperatures above room temperature or high dilutions of the cellulose ester in the fatty acids greater percentages of water can be tolerated without precipitating the cellulose ester than otherwise. It is preferable to also add mineral acid such as hydrochloric or sulfuric acid in an amount of 5–10% based on the weight of the cellulose and the hydrolysis is allowed to proceed either at room temperature, within the temperature of 70–100° F. or more. If the acetic acid is much more than the percentage designated, precipitation of the cellulose isobutyrate may be effected, because acetic acid and water is a poorer solvent for cellulose isobutyrate than isobutyric acid and water. The hydrolysis procedure may be carried out for from 5–20 hours depending upon the conditions used. The cellulose isobutyrates thus obtained are suitable for use in preparing plastic compositions or the like.

The following example illustrates our invention:

*Example*

Cellulose was esterified with isobutyric anhydride and zinc chloride catalyst as described in Malm and Blanchard application Serial No. 435,041 entitled "A Process of Preparing Isobutyric Acid Esters of Cellulose" filed of even date, under moderate conditions. After the esterification had been completed as shown by the dissolving of the cellulose in the mass, the excess isobutyric anhydride was destroyed by adding dilute aqueous acetic acid accompanied by rapid stirring. The solution obtained consisted of 8 lbs. of cellulose isobutyrate, 9.0 lbs. of acetic acid, 14.1 lbs. of isobutyric acid, 0.46 lb. of water and 1.75 lbs. of zinc chloride. There was prepared therefrom two portions designated A and B of 91 grams each. Each of these portions contained 25 grams of acetic acid and 39 grams of isobutyric acid. To portion A was added 10 grams of water and 2 grams of hydrochloric acid, 200 grams of acetic acid and none of isobutyric acid so that the ratio of acetic to isobutyric acid was 85:15. Hydrolysis of the cellulose isobutyrate therein was carried out by allowing the mass to stand at 100° F. for 10 hours. The mass obtained had an opaque, gel-like appearance. To the second portion was added 10 grams of water, 2 grams of concentrated hydrochloric acid, 107 grams of acetic acid and 93 grams of isobutyric acid. The ratio of acetic to isobutyric acid was 50:50. Hydrolysis of the cellulose isobutyrate therein was carried out by allowing the mass to stand at 100° F. for 10 hours. The solution obtained was transparent.

We claim:

1. In a method of preparing hydrolyzed cellulose isobutyrate the series of steps which comprises isobutyrylating cellulose with a bath essentially consisting of isobutyric acid, isobutyric anhydride and zinc chloride catalyst, after the cellulose has been esterified, supplying water to the mass to convert any anhydride remaining to the corresponding acid, adding acetic acid and water thereto to form a bath in which 40–60% of the fatty acid therein is acetic acid and the water is in an amount at least within the range of 10–20% concentration but insufficient to precipitate the cellulose ester and allowing the mass to stand until the cellulose ester has been hydrolyzed to the desired value.

2. In a method of preparing hydrolyzed cellulose isobutyrate the series of steps which comprises isobutyrylating cellulose with a bath essentially consisting of isobutyric acid, isobutyric anhydride and zinc chloride catalyst, after the cellulose has been esterified, supplying water to the mass to convert any anhydride remaining to the corresponding acid, adding acetic acid and water thereto to form a bath in which 40–60% of the fatty acid therein is acetic acid and the water is in an amount at least within the range of 10–15% concentration but insufficient to precipitate the cellulose ester and allowing the mass to stand until the cellulose ester has been hydrolyzed to the desired value.

3. In a method of preparing hydrolyzed cellulose isobutyrate the series of steps which comprises isobutyrylating cellulose with a bath essentially consisting of isobutyric acid, isobutyric anhydride and zinc chloride catalyst, after the cellulose has been esterified, supplying water to the mass to convert any anhydride remaining to the corresponding acid, adding acetic acid, water and strong mineral acid thereto to form a bath in which 40–60% of the fatty acid therein is acetic acid, the water therein is in an amount of at least 10–20% concentration but not sufficient to precipitate the cellulose ester and the mineral acid is 5–10% of the initial cellulose and allowing the mass to stand until the cellulose ester has been hydrolyzed to the desired point.

4. In a method of preparing a hydrolyzed cellulose isobutyrate the series of steps which comprises isobutyrylating cellulose with a bath essentially consisting of isobutyric acid, isobutyric anhydride and zinc chloride catalyst, after the cellulose has been esterified, supplying water to the mass to convert any anhydride remaining to the corresponding acid, adding acetic acid, water and hydrochloric acid thereto to form a bath in which 40–60% of the fatty acid therein is acetic acid, the water therein is of at least 10–20% concentration but not sufficient to precipitate the cellulose ester and the hydrochloric acid is an amount 5–10% of the initial cellulose and allowing the mass to stand until the cellulose ester is hydrolyzed to the desired point.

5. In a method of preparing a hydrolyzed cellulose isobutyrate the series of steps which comprises isobutyrylating cellulose with a bath essentially consisting of isobutyric acid, isobutyric anhydride and zinc chloride catalyst, after the cellulose has been esterified, supplying water to the mass to convert any anhydride remaining to the corresponding acid, adding acetic acid, water and sulfuric acid thereto to form a bath in which 40–60% of the fatty acid therein is acetic acid, the water therein is of at least 10–20% concentration but not sufficient to precipitate the cellulose ester and the sulfuric acid is an amount 5–10% of the initial cellulose and allowing the mass to stand until the cellulose ester is hydrolyzed to the desired point.

References Cited in the file of this patent

UNITED STATES PATENTS

| | | |
|---|---|---|
| 1,652,573 | Mallabar | Dec. 13, 1927 |
| 1,878,954 | Malm | Sept. 20, 1932 |
| 1,912,189 | Gault et al. | May 30, 1933 |
| 2,064,226 | Seymour | Dec. 15, 1936 |
| 2,072,260 | Haney | Mar. 2, 1937 |
| 2,095,334 | Jones | Oct. 12, 1937 |
| 2,339,631 | Fletcher et al. | Jan. 18, 1944 |

FOREIGN PATENTS

| | | |
|---|---|---|
| 325,209 | Great Britain | Feb. 11, 1930 |